Nov. 6, 1945.  R. E. MARBURY  2,388,639
CONTROL SYSTEM
Filed May 15, 1942
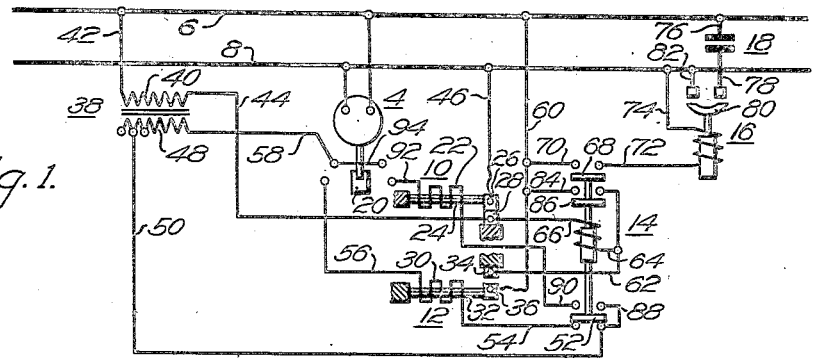
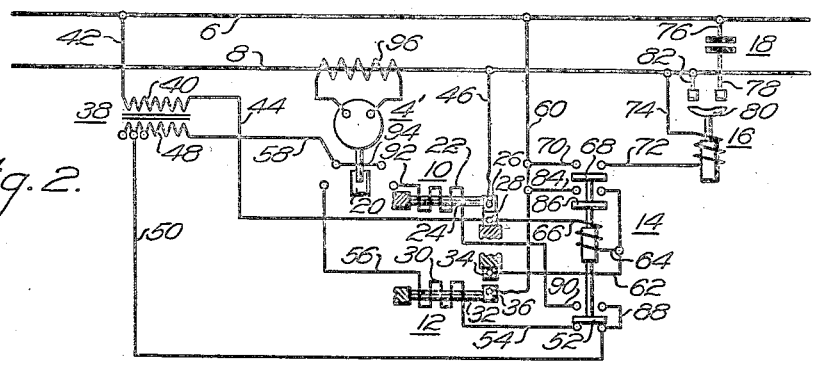
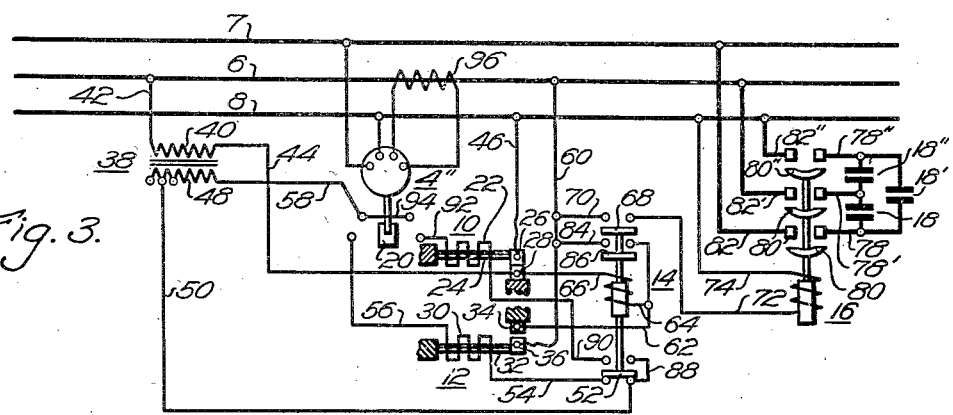
WITNESSES:
Robert C. Baird
Joe Weber
INVENTOR
Ralph E. Marbury.
BY
Crawford
ATTORNEY Patented Nov. 6, 1945

2,388,639

UNITED STATES PATENT OFFICE 2,388,639

CONTROL SYSTEM

Ralph E. Marbury, Wilkinsburg, Pa., assignor to Westinghouse Electric Corporation, East Pittsburgh, Pa., a corporation of Pennsylvania Application May 15, 1942, Serial No. 443,062

8 Claims. (Cl. 175—320)

The present invention relates, generally, to control systems, and, more particularly, to systems for controlling the power transmitting capacity of a distribution circuit which supplies a reactive load.

In the operation of electric power distribution circuits to which reactive loads are connected, the reactive component is often such a large proportion of the total current in the circuit that the total power transmitted over the circuit within the limitation of the current carrying capacity of the circuit conductors is appreciably limited. The potential drop in the conductors of such a circuit is also excessive for the amount of actual power transmitted because of the presence of the large reactive current component which performs no useful work but does cause line potential drop.

It is common practice to provide a power circuit having a reactive load with means for supplying a component of reactive current in an opposing sense to the reactive component of the load current to thereby reduce the value of the reactive component of the current in the circuit and reduce the line power losses and potential drop.

An object of the present invention is to provide a control system for a reactive current supplying means which shall function in response to the effects of sustained variations of the conditions of a load circuit to control the connection of reactive current supplying means to the load circuit.

Another object of the invention is to provide a control system for a reactive current supplying means which shall function to control the connection of the reactive current supplying means to a load circuit in response to load conditions on the circuit such as line current, line potential and power factor, which shall be simple and efficient in operation and inexpensive to manufacture, install, operate, and maintain.

These and other objects and advantages of the invention will be apparent from the following detailed description taken in connection with the accompanying drawing, in which Figures 1, 2 and 3 are diagrammatic representations of control systems embodying the principal features of the invention and in which like reference characters designate like elements in the several figures.

Considering the general aspects of the embodiment of the invention shown in Fig. 1, a potential responsive device 4 is connected to respond to the potential across the conductors 6 and 8 of a load circuit, and functions in cooperation with a pair of thermal responsive devices 10 and 12, a relay 14, and a circuit control device 16 to control the connection of a reactive current supplying means, such as a capacitor 18, to the conductors 6 and 8. In the embodiments of the invention shown in Figs. 2 and 3, the control systems function in response to a current responsive device 4', and a reactive kva. responsive device 4'', respectively.

Considering the invention more in detail, a contact element 20 may be actuated by the potential responsive device 4 to right-hand contact position when the potential between the conductors 6 and 8 increases to a predetermined value, and to the left-hand contact position when the potential across the conductors 6 and 8 decreases to a predetermined value. In the right-hand contact position the contact element 20 controls an energizing circuit for a heating element 22 of the thermal responsive device 10 which acts upon a bimetallic element 24, or other suitable heat responsive element 7, to separate the normally engaged contact elements 26 and 28. In the left-hand contact position, the contact element 20 controls an energizing circuit for a heating element 30 of the thermal responsive device 12 to act upon a heat responsive element, such as the bimetallic element 32, which causes engagement of the normally disengaged contact elements 34 and 36.

A transformer 38 has a primary winding 40 which is normally energized in a circuit extending from the conductor 6, through a conductor 42, the primary winding 40, a conductor 44, the contact elements 28 and 26, and a conductor 46 to the conductor 8. The heating element 30 of the thermal responsive device 12 is energized in a circuit extending from one terminal of the tapped secondary winding 48 of the transformer 38 through a conductor 50, a contact element 52 of the relay 14 in back contact position, a conductor 54, the heating element 30, a conductor 56, the contact element 20 in the left-hand contact position, and a conductor 58 to one of the other terminals of the secondary winding 48, as shown.

When the bimetallic element 32 has been heated for sufficient time to cause engagement of the contact elements 34 and 36, an energizing circuit will be completed for the winding of the relay 14 which extends from the conductor 6 through a conductor 60, the contact elements 36 and 34, conductors 62 and 64, the winding of the relay 14, a conductor 66, the contact elements 28 and 26, and the conductor 46 to the conductor 8.

When the relay 14 is actuated, its contact element 68 will close an energizing circuit for the circuit control device 16 which extends from the conductor 6 through conductors 60 and 70, the contact element 68, a conductor 72, the winding of the circuit control device 16, and a conductor 74 to the conductor 8. The actuation of the circuit control device 16 will cause the capacitor 18 to be connected to the conductors 6 and 8 in a circuit extending from the conductor 6, through a conductor 76, the capacitor 18, a conductor 78, a contact element 80 of the circuit control device 16, and a conductor 82 to the conductor 8.

The actuation of the relay 14 will cause it to close its own holding circuit extending from the conductor 6, through conductors 60 and 84, a contact element 86 of the relay 14, the conductors 62 and 64, the winding of the relay 14, the conductor 66, the contact elements 28 and 26, and the conductor 46 to the conductor 8.

The energizing circuit for the heating element 22 of the thermal responsive device 10 extends from one terminal of the secondary winding 48 through conductors 50 and 88, the contact element 52 in front contact position, a conductor 90, the heating element 22, a conductor 92, the contact element 20 in the right-hand contact position, and conductors 94 and 58 to the other terminal of the secondary winding 48.

In the operation of the embodiment of the invention shown in Fig. 1, when the inductive load on the conductors 6 and 8 increases to such an extent as to lower the potential between the conductors 6 and 8 sufficiently to cause the contact element 20 to be moved to the left-hand contact position, the heating element 30 will be energized. A predetermined time thereafter, as determined by the capacity of the heater element 30 and the voltage applied thereto, the bimetallic element 32 will close the contact elements 34 and 36. The closure of the contact elements 34 and 36 will energize the relay 14 which will close its own holding circuit and the energizing circuit for the circuit control device 16 to thereby connect the capacitor 18 between the conductors 6 and 8.

When the capacitor 18 is connected between the conductors 6 and 8, it will draw a leading current to compensate for the lagging component of the load current in the conductors 6 and 8 due to the inductive load, to thereby decrease the total load current in the conductors 6 and 8. The decrease in the load current will cause a decrease in the line drop in the conductors 6 and 8 and thereby increase the potential acting on the potential responsive device 4 to thereby move the contact element 20 from the left-hand contact position. The connection of the capacitor 18 to the conductors 6 and 8 will thus permit the conductors 6 and 8 to transmit the load with a smaller current and therefore a smaller line drop, and the potential between the conductors 6 and 8 will thereby be maintained at a higher value.

When the load on the conductors 6 and 8 is decreased, the potential across the line conductors 6 and 8 will increase due to the decreased line drop in conductors 6 and 8 and the contact element 20 will be moved to the right-hand contact position. After a predetermined energization of the heating element 22 and the heating of the bimetallic element 24, the contact elements 26 and 28 will be disengaged to open the energizing circuit for the winding of the relay 14 to thus release the relay 14 which, in turn, will release the control device 16 to disconnect the capacitor 18 from the conductors 6 and 8. Thus the system will function to provide a more uniform potential between the conductors 6 and 8 by connecting the capacitor 18 to the conductors 6 and 8, or disconnecting the capacitor 18 from the conductors 6 and 8 when the load conditions on the conductors 6 and 8 are such as to require increase or decrease of the compensation for the lagging component of current in the conductors 6 and 8.

The embodiment of the invention of Fig. 2 operates substantially the same as that of Fig. 1 with the exception that the contact element 20 is operated by a current responsive device 4' which is connected to a current transformer 96 which in turn is disposed to respond to the current in the conductor 8. In the operation of the system of Fig. 2, when the current in the conductor 8 becomes sufficiently high to require compensation of its inductive component, the contact element 20 will be moved to left-hand contact position to cause the system to connect the capacitor 18 to the conductors 6 and 8. Likewise, when the current in the conductor 8 again decreases to a predetermined value, the contact element 20 will be moved to the right-hand contact position to cause the system to disconnect the capacitor 18 from the conductors 6 and 8.

In the embodiment of the invention of Fig. 3, the contact element 20 is controlled by a reactive kva. device 4'' which is connected to measure the reactive kva. on the three phase circuit comprising the conductors 6, 7 and 8, to actuate the contact element 20 to the left-hand contact position when there is a predetermined amount of lagging reactive kva., and to actuate the contact element 20 to the right-hand contact position when there is a predetermined amount of leading reactive kva.

The circuit control device 16 is so disposed that, when actuated, its contact elements 80, 80' and 80''. connect a capacitor bank 18—18'—18'' to the three phase power conductors 6, 7 and 8 through the circuits 78—82, 78'—82', and 78''—82''. Thus when the lagging reactive kva. due to the inductive load on the conductors 6—7—8 increases to such a value as to cause the contact element 20 to move to the left-hand contact position, the system will connect the capacitor bank 18—18'—18'' to the power conductors to thus compensate for the lagging reactive kva. When the load on the power conductors 6—7—8 decreases to where there is over-compensation for the lagging component of kva., the contact element 20 will move to the right-hand contact position due to excessive leading kva. and the system will disconnect the capacitor bank 18—18'—18'' from the power conductors 6—7—8.

In each of the embodiments of the invention hereindescribed, the thermal responsive devices 10 and 12 make it necessary that the load conditions requiring connection or disconnection of the capacitor 18 to the conductors 6 and 8 persist sufficiently long to permit the thermal responsive devices 10 and 12 to operate their contact elements. Thus, sudden changes of load on the conductors 6 and 8 will not affect the system but persistent changes of the load will cause the system to function to compensate for the reactive component of the load current.

It is to be understood that the function of the system is to provide a reactive component of current which is opposite to the normal reactive component of current of the load on the conductors 6 and 8, and that in the event that the normal load on the conductors 6 and 8 in the nature of capacitive reactance, an inductor may be substituted for the capacitor 18 to thereby compensate for the capacitive reactance of the load.

Thus it will be seen that I have provided a control system for a reactive current supplying means which shall function to control the connection of the reactive current supplying means to a load circuit in response to sustained variations of load conditions on the circuit.

In compliance with the requirements of the patent statutes, I have shown and described herein the preferred embodiments of my invention. It is to be understood, however, that the invention is not limited to the precise constructions shown and described, but is capable of modification by one skilled in the art, the embodiments herein shown being merely illustrative of the principles of my invention.

I claim as my invention:

1. A relay control system comprising, electroresponsive switch means operable to connect a device to an electric circuit, a relay for controlling the energization of said switch means, first and second electrothermal relays operable to control the energization of the control relay, said first thermal relay having normally open contact members and said second thermal relay having normally closed contact members, an energizing circuit for the control relay including said normally open and normally closed contact members in series relation, a holding circuit for the control relay extending through said normally closed contact members, said control relay having contact members operable to close said holding circuit upon closure of the relay, and relay means responsive to predetermined electrical conditions of the electric circuit for selectively controlling the energization of the electrothermal relays to alternately connect and disconnect the said device to and from the electric circuit in accordance with said predetermined electrical conditions.

2. A relay control system comprising, electroresponsive switch means operable to connect a device to an electric circuit, a control relay operable to control the energization of the switch means, an energizing circuit for the control relay, a first electrothermal relay having normally open contact members and a second electrothermal relay having normally closed contact members for controlling the energizing circuit for the control relay, an energizing circuit for each of the electrothermal relays, and relay means operable to different contact making positions in response to different predetermined electrical conditions of the electric circuit for selectively controlling said energizing circuits, said control relay functioning when operated to its closed position in response to the operation of the relay means to one position to interrupt the energizing circuit of the first electrothermal relay and to condition the energizing circuit of the second electrothermal relay for subsequent energization in response to the operation of said relay means to another position.

3. A relay control system comprising, electroresponsive switch means for connecting a device to an electric circuit, a relay for controlling the energization of said switch, first electrothermal switch means having normally open contact members for controlling the energization of said control relay to effect the closure thereof, a holding circuit including normally open contact members of the control relay for maintaining said control relay closed in response to the closure thereof, second electrothermal switch means having normally closed contact members connected in the holding circuit for releasing said control relay, and relay means operable to different contact making positions in response to different predetermined electrical conditions on the electric circuit for selectively energizing said first and second electrothermal switch means in the order named, whereby said device is automatically connected to and disconnected from the electric circuit in accordance with the predetermined load conditions thereof.

4. A relay control system comprising, electroresponsive switch means operable to connect a device to an electric circuit, a control relay for controlling the energization of said switch means, first and second electrothermal relays having normally open and normally closed contact members, respectively, each of said relays also having a heater element, an energizing circuit for the control relay including said normally open and normally closed contact members in series relation, a holding circuit for the control relay including a normally open contact member thereof and the normally closed contact member of the second electrothermal relay, energizing circuits for the heater elements of the electrothermal relays, the energizing circuit for said first lectrothermal relay extending through normally closed contact members of the control relay and the energizing circuit for said second electrothermal relay extending through normally open contact members of the control relay, and a relay operable to different contact making positions in response to different predetermined electrical conditions of the electric circuit for alternately completing the energizing circuits of the heater elements, whereby the device is automatically connected to and disconnected from the electric circuit in accordance with said predetermined electrical conditions.

5. A relay control system comprising, electroresponsive switch means operable to connect a device to an electric circuit, a relay for controlling the energization of said switch means, first and second electrothermal relays operable to control the energization of the control relay, said first thermal relay having normally open contact members and said second thermal relay having normally closed contact members, an energizing circuit for the control relay including said normally open and normally closed contact members in series relation, a holding circuit for the control relay extending through said normally closed contact members, said control relay having contact members operable to close said holding circuit upon closure of the relay, and relay means responsive to the potential of the electric circuit for selectively controlling the energization of the electrothermal relays to alternately connect and disconnect the said device to and from the electric circuit in accordance with said potential.

6. A relay control system comprising, electroresponsive switch means operable to connect a device to an electric circuit, a control relay operable to control the energization of the switch means, an energizing circuit for the control relay, a first electrothermal relay having normally open contact members and a second electrothermal relay having normally closed contact members for controlling the energizing circuit for the control relay, an energizing circuit for each of the electrothermal relays, and relay means operable to different contact making positions in response to the potential on the electric circuit for selectively controlling said energizing circuits, said control relay functioning when operated to its closed position in response to the operation of the relay means to one position to interrupt the energizing circuit of the first electrothermal relay and to condition the energizing circuit of the second electrothermal rleay for subsequent energization in response to the operation of said relay means to another position.

7. A relay control system comprising, electroresponsive switch means operable to connect a device to an electric circuit, a relay for controlling the energization of said switch means, first and second electrothermal relays operable to control the energization of the control relay, said first thermal relay having normally open contact members and said second thermal relay having normally closed contact members, an energizing circuit for the control relay including said normally open and normally closed contact members in series relation, a holding circuit for the control relay extending through said normally closed contact members, said control relay having contact members operable to close said holding circuit upon closure of the relay, and relay means responsive to the load current of the electric circuit for selectively controlling the energization of the electrothermal relays to alternately connect and disconnect the said device to and from the electric circuit in accordance with said load current.

8. A relay control system comprising, electroresponsive switch means operable to connect a device to an electric circuit, a relay for controlling the energization of said switch means, first and second electrothermal relays operable to control the energization of the control relay, said first thermal relay having normally open contact members and said second thermal relay having normally closed contact members, an energizing circuit for the control relay including said normally open and normally closed contact members in series relation, a holding circuit for the control relay extending through said normally closed contact members, said control relay having contact members operable to close said holding circuit upon closure of the relay, and relay means responsive to the power factor of the load of the electric circuit for selectively controlling the energization of the electrothermal relays to alternately connect and disconnect the said device to and from the electric circuit in accordance with said power factor of the load.

RALPH E. MARBURY.